Jan. 9, 1934.　　　D. JUNOR ET AL　　　1,942,708
SOD CUTTER
Filed March 21, 1931
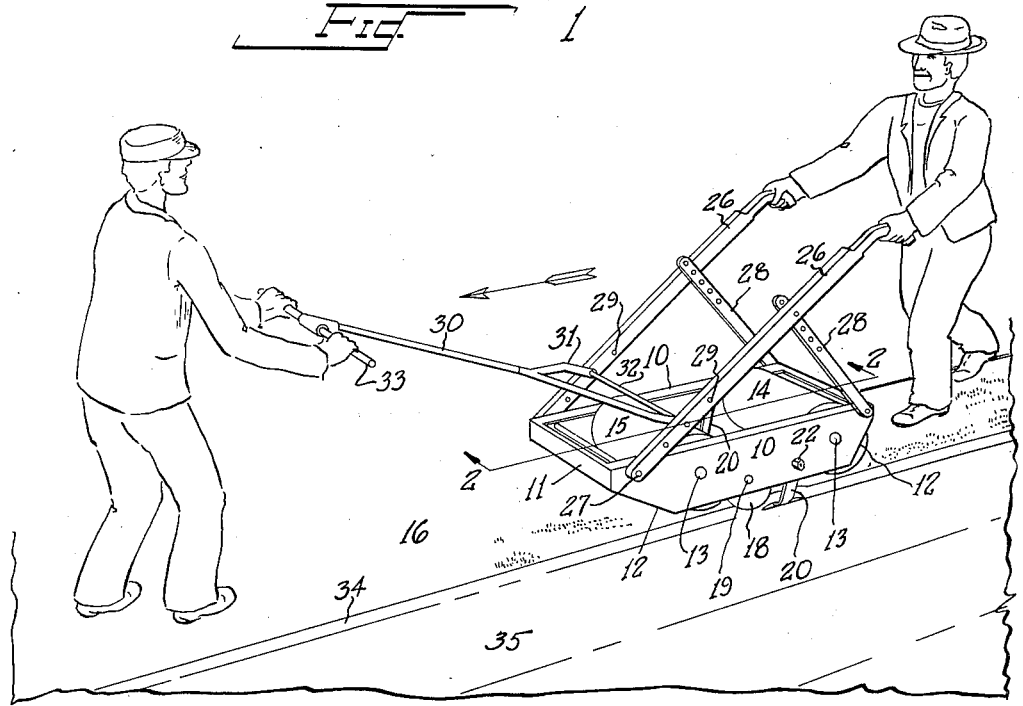
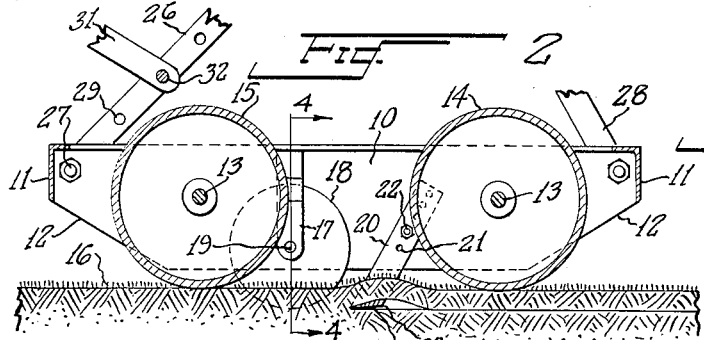
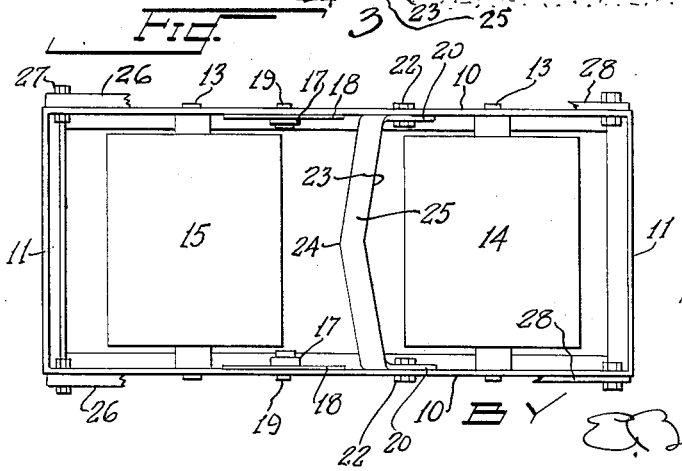
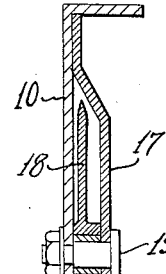
INVENTORS
D. JUNOR
C. A. SHARP
BY
ATTORNEY Patented Jan. 9, 1934

1,942,708

UNITED STATES PATENT OFFICE 1,942,708

SOD CUTTER

Donald Junor, Beaverton, and Clayton A. Sharp, Portland, Oreg.

Application March 21, 1931. Serial No. 524,324

3 Claims. (Cl. 97—226)

This invention relates generally to the art of landscaping, and particularly to a sod cutter.

The main object of this invention is to construct a sod cutter especially adapted to manual operation and which will make it possible to cut sod of extremely uniform thickness regardless of the contour of the ground.

The second object is to render it possible to cut sod satisfactorily with a low priced machine and with a minimum amount of physical effort.

The third object is to construct a sod cutter which will require but a slight amount of skill in order to satisfactorily operate same.

The fourth object is to construct a sod cutter which will be so designed that unnecessary weight may be eliminated and that the cutting knife will tend to hold itself at the desired depth.

These, and other objects, will become more apparent from the specification following as illustrated in the accompanying drawing, in which:

Fig. 1 is a perspective view showing the device in use.

Fig. 2 is a vertical longitudinal section taken along the line 2—2 in Fig. 1.

Fig. 3 is a bottom view of the device.

Fig. 4 is a vertical section taken along the line 4—4 in Fig. 2.

Similar numbers of reference refer to similar parts throughout the several views.

Referring in detail to the drawing, there is shown a pair of side frames 10 which are joined at their forward and rearward ends by means of the cross ties 11 which are preferably inturned (as shown) to lend rigidity to the frame. The same is true of the side frames 10. The sides 10 are preferably cut away on their lower corners to provide a sloping face 12. Mounted between the sides 10 on the axles 13 are the rollers 14 and 15 which support the device on the sod 16.

Near the forward roller 15 and secured to each side 10 is a bracket 17 for the purpose of supporting the rolling cutting disks 18 which are mounted on the bolts 19. In line with the disks 18 are the side arms 20 which are provided with a series of holes 21 for the reception of the bolts 22, by means of which the angularity and adjustment of the arms 20 may be varied. The lower ends of the arms 21 are connected by means of a cutting blade 23 whose middle 24 is somewhat in advance of its ends to improve the cutting action. The under side 25 of the blade 23 slopes downwardly for the purpose of causing the device to hug the surface of the sod and insure a uniform cutting depth throughout its action.

The device is propelled by a pair of handles 26 which are pivotally joined at their lower ends by means of the bolts 27 to the sides 10 and adjustably joined to the sides 10 at intermediate points by means of the braces 28, which are perforated to permit adjusting same to the most convenient height for the operator. Toward the lower end of each handle 26 are formed a number of holes 29 varying in distance above the bolts 27. To the handles 26 is attached a tongue 30 having a bifurcated end 31, the portions of which are attached to the handle 26 by means of the bolt 32. The tongue 30 is provided with a cross bar 33 by means of which the second operator may assist in the propulsion of the device. The steering is of course accomplished mainly by the operator who grips the handles 26.

In operation the device is handled very much the same as an ordinary push cultivator—that is to say, with a reciprocating motion—which enables the operator at the forward end of the vehicle to walk backward.

It will be noted that while the disks 18 on one side of the device are normally not cutting but are merely running along the edge 34 between the sod 16 and the uncovered earth 35, that it is desirable to have these disks on both sides of the device, not only for the purpose of permitting same to operate in both directions, but also to make it possible, for example, to remove a strip of sod for the purpose of forming a trench for any purpose whatsoever, and doing this so accurately that the sod can be replaced with scarcely any indication that it has been removed.

Obviously, to vary the thickness of the sod it is only necessary to adjust the position of the arms 20 by changing the location of the bolts 22. Where the cutting is difficult it is desirable to raise the point of attachment of the tongue 30 by placing the bolt 32 in a pair of higher holes 29.

It will be understood that the T handle 33 is rotatably mounted on the end of the tongue 30 for the purpose of limiting the action of the foremost operator to that of pushing and pulling in order to keep the control of the cutting angle in the hands of the operator who grasps the handles 26. This rotatable relationship is obtained by making connection between the tongue 30 and the T of the handle 33 a loose fit and then heading the end of the tongue inside of the T, or otherwise preventing its withdrawal.

We claim:

1. A sod cutter comprising a rectangular frame having a sod-engaging roller supporting each end thereof, a horizontal transversely disposed knife carried by said frame between said rollers, a vertical disk cutter in front of each end of said knife, a pair of handles pivotally connected to the forward end of said frame and adjustably braced to the rear end of said frame whereby the grips of said handles will be directly over the rearmost roller, and a combined pushing and pulling tongue pivotally attached to said handles approximately above the foremost roller.

2. A sod cutter comprising a rectangular frame, a pair of sod-engaging rollers mounted between the sides of said frame near the opposite ends thereof, a horizontal transversely disposed cutting knife dependent from said frame, a pair of sloping handles pivotally attached to the forward end of said frame at their lower ends and having the grips of said handles approximately directly above the rearmost roller, adjustable brace members between the rearward ends of said frame and said sloping handles, a tongue pivotally attached to said sloping handles in a line substantially between the front and rearmost edges of the front roller, and a T handle rotatably mounted on the outermost end of said tongue.

3. The substance of claim 2, and a disk cutter mounted at each end of said horizontal knife behind the foremost roller.

DONALD JUNOR.
CLAYTON A. SHARP.